April 23, 1940.　　　C. A. CAMPBELL　　　2,198,426
AIR BRAKE
Filed Jan. 12, 1939　　　3 Sheets-Sheet 1
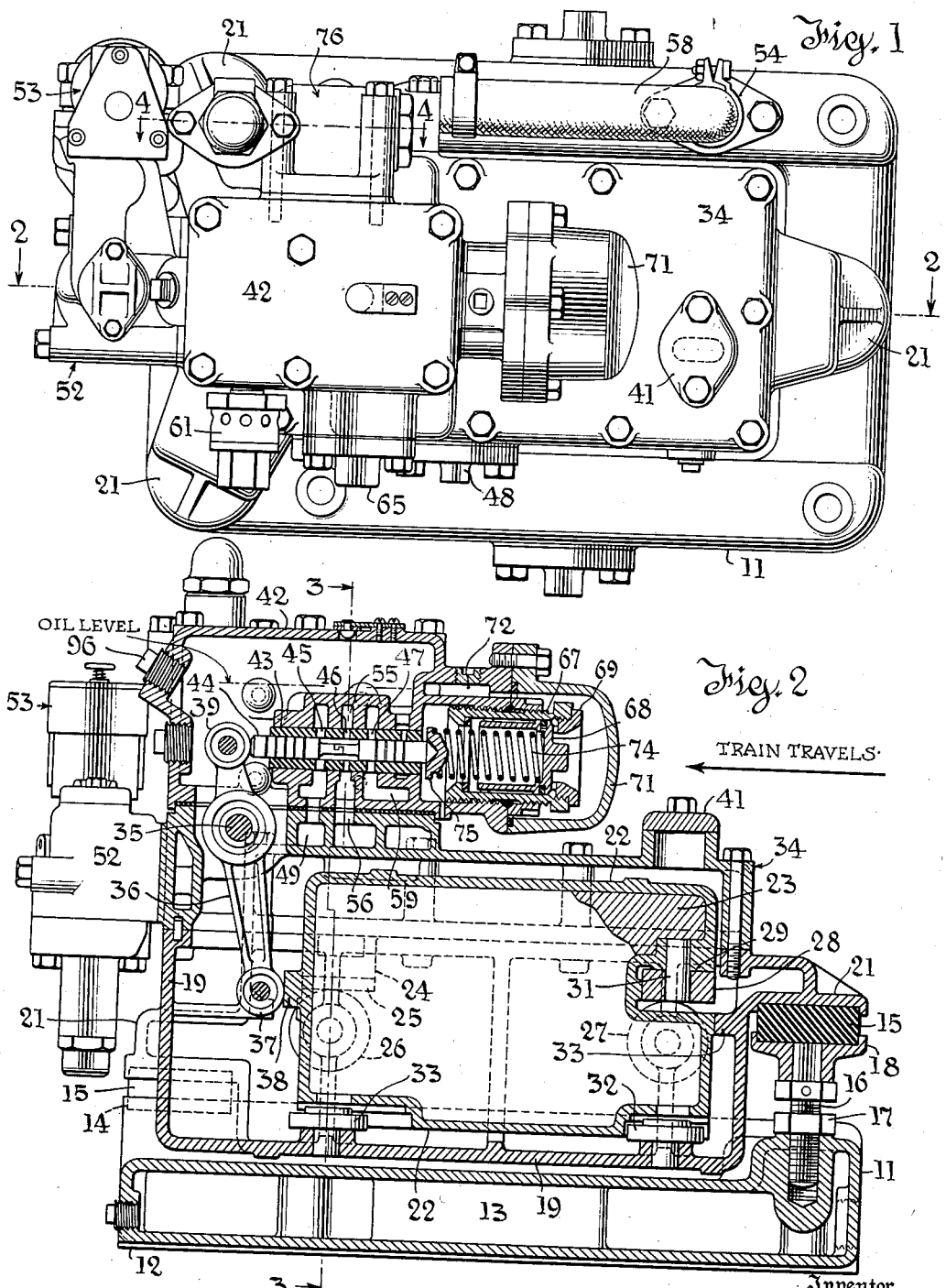

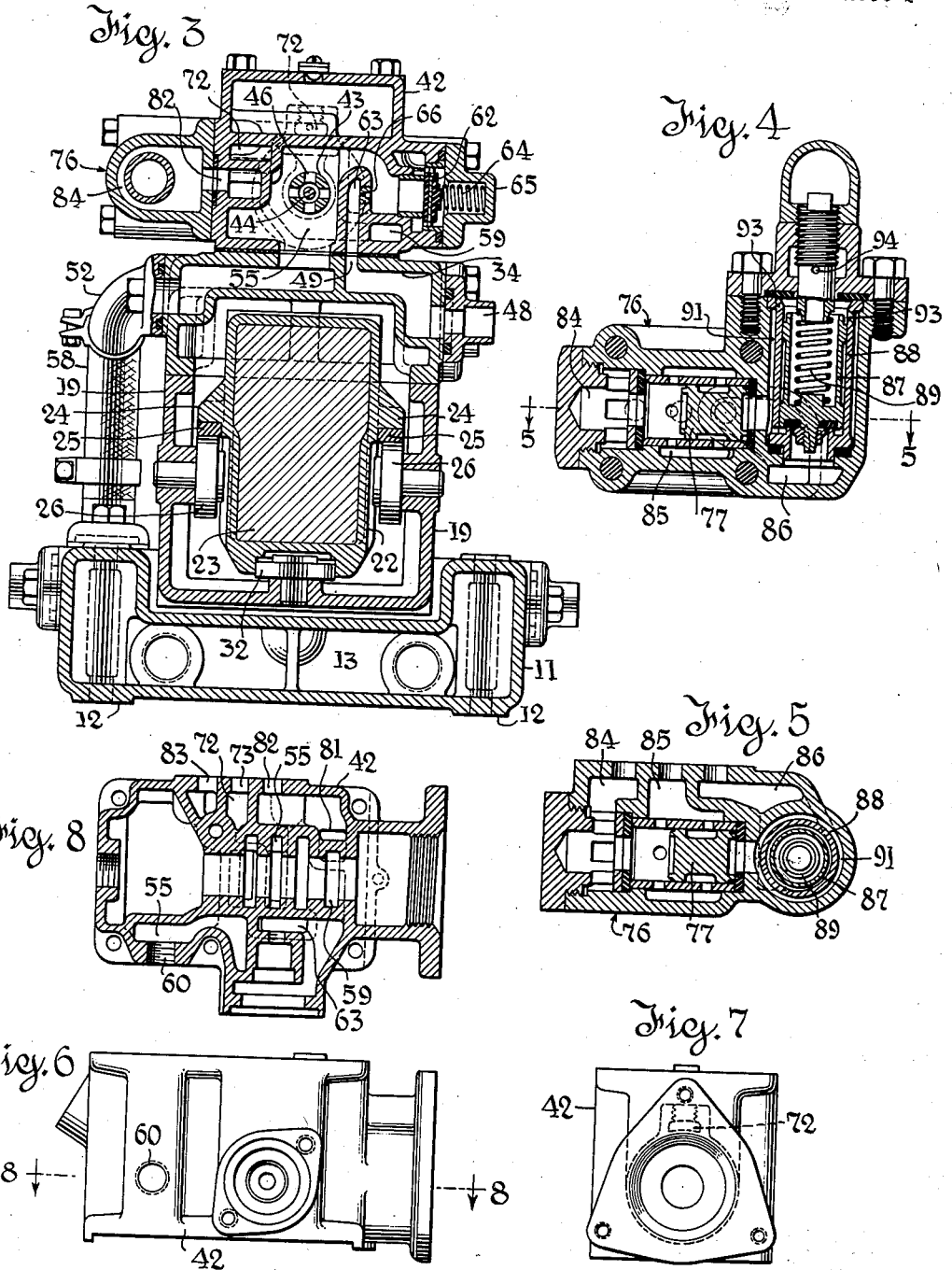

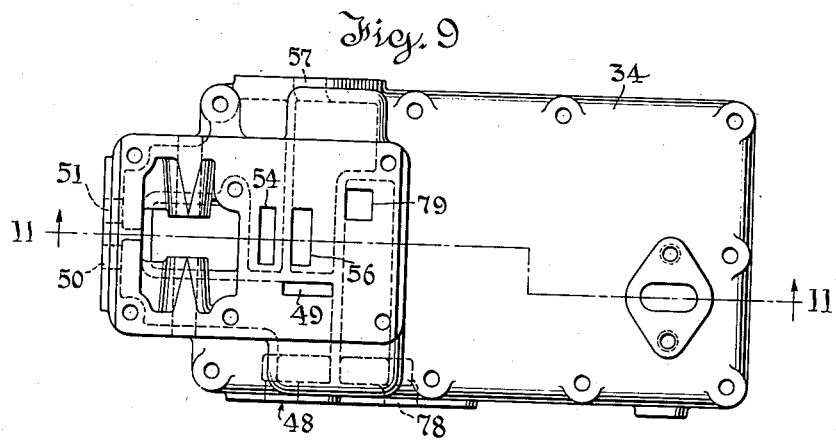
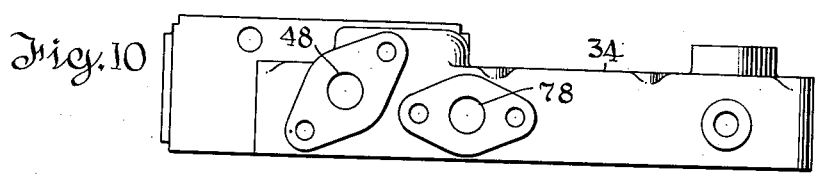
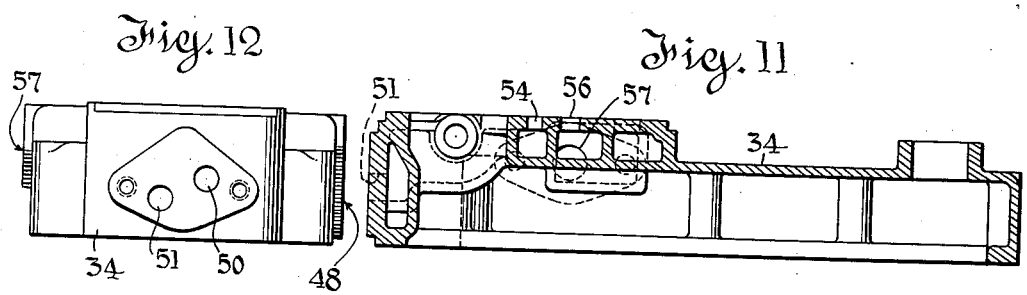
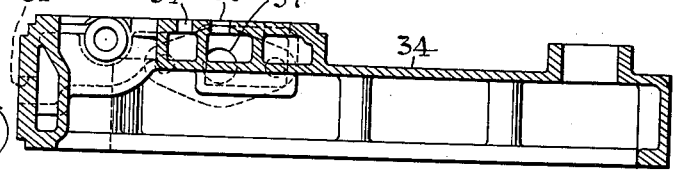
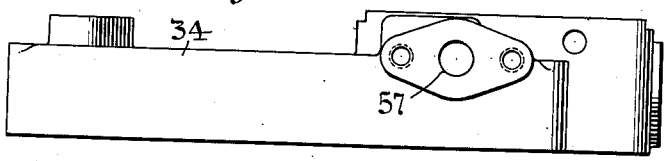

Patented Apr. 23, 1940

2,198,426

UNITED STATES PATENT OFFICE 2,198,426

AIR BRAKE

Charles A. Campbell, Watertown, N. Y., assignor to The New York Air Brake Company, a corporation of New Jersey Application January 12, 1939, Serial No. 250,664

7 Claims. (Cl. 303—24)

This invention relates to air brakes and particularly to a deceleration controller used, for example, in systems known as schedule DCE, schedule HSC and schedule AHSC. The DCE system is described and claimed in the patent to Campbell, No. 2,136,530, and the components of the AHSC system pertinent to the present invention are shown in the Campbell Patent No. 2,136,582, both issued November 15, 1938.

The purpose of the present invention is to produce a unitary structure, including the control chamber, the decelerometer, the modulating valve, the change-over valve with its associated double-seated check-valve and at least one pressure limiting valve with associated by-pass valve and controlling magnet valve, all arranged to be dismounted for inspection, repair or replacement of parts, with marked facility, and in nearly every case without breaking pipe connections.

Generally stated, the control chamber serves as a base for the entire mechanism. The combined base and control chamber supports the decelerometer and modulating valve on three rubber supporting pads, one of which is vertically adjustable to permit leveling of the path of the decelerometer mass. These three pads support a cup-like oil retaining case in which are mounted the guide rollers which support the decelerometer mass.

The case just described supports a cover to which all pipe connections are made except connections to the control chamber, these being made directly. The cover carries the motion transmitting lever of the decelerometer. It also supports a separate housing in which the entire mechanism of the pressure limiting and associated by-pass valve is housed. Removably mounted on the top of the cover is the housing which contains the modulating valve mechanism, together with the adjustable loading means therefor. Releasably mounted on the side of the modulating valve housing is the casing which carries the change-over and associated double seated check valve.

The construction is such that the double-seated check valve and the change-over valve can be removed as a unit without breaking any pipe connection. The same is true of the pressure limiting valve unit. The modulating valve, together with the double-seated check valve and the change-over valve, can be removed as a unit without breaking the pipe connections.

The decelerometer mass is mounted below the modulating valve instead of above it as heretofore. Because of this new arrangement, the decelerometer mass is always completely submerged in a rather closely confined bath of oil instead of being partly submerged as heretofore. This prevents oil surging adjacent the decelerometer mass, and eliminates whatever disturbing effect such surging has.

No claim is here made to the pressure limiting valve and its associated mechanism nor to the equalizing bleed port between the control pipe port and the control chamber, as these features form a part of the subject matter of a copending application, Serial No. 250,665, filed January 12, 1939.

The invention will now be described in connection with the accompanying drawings, in which—

Figure 1 is a plan view of the complete deceleration controller.

Figure 2 is a vertical section on the line 2—2 of Figure 1.

Figure 3 is a vertical section on the line 3—3 of Figure 2.

Figure 4 is a section through the double-seated check valve and the change-over valve, the plane of section being indicated by the line 4—4 on Figure 1.

Figure 5 is a section on the line 5—5 of Figure 4.

Figure 6 is a side elevation of the housing for the modulating valve.

Figure 7 is an elevation of the rear end thereof, i. e., the right end as viewed in Figure 2. The cap is not shown.

Figure 8 is a section on the line 8—8 of Figure 6.

Figure 9 is a plan of the combined cover unit and pipe bracket.

Figure 10 is a left side elevation thereof.

Figure 11 is a section on the line 11—11 of Figure 9.

Figure 12 is a front end elevation of the combined cover and pipe bracket.

Figure 13 is a right side elevation thereof.

Referring, first, to Figures 1, 2 and 3, the base for the device is a hollow casting 11 which is generally U-shaped in vertical cross section (see Figure 3) and is provided on its lower face with the mounting pads 12 through which it is rigidly bolted to any suitable support. The chamber 13 is the control chamber of the system, i. e., it corresponds to the chamber 101 of Patent No. 2,136,580 and the chamber 98 of Patent No. 2,136,582.

The device must be definitely oriented with reference to the direction of travel of the train, and this direction of travel is indicated on Figure 2 by a legend, "Train Travels". The terms "forward" and "rear", "right" and "left" will be used with reference to the direction of travel of the train.

At the forward end of the base 11 near the sides are two spaced sockets 14 in which are mounted rubber pads 15. At the rear of the base 11 and on the center line thereof a supporting stud 16 is threaded into the base 11, a lock nut 17 being used to fix its adjustment. The stud 16 carries a socket 18 in which is mounted a third rubber pad 15. The base 11 is properly leveled on the car. The adjustment afforded by the stud 16 merely permits a final precise leveling adjustment of the path of the decelerometer mass. The three members 15 support an open topped, box-like housing or case 19 by means of three projecting lugs 21 formed on that housing and overlying the pads 15 (see Figures 1 and 2).

The decelerometer mass is a cast metal shell 22 filled with lead, indicated at 23. At its forward end, on each side, the shell is provided with an integral lug 24. Against the lower face of each lug is removably mounted a hardened steel track 25. The tracks 25 run on hardened anti-friction rollers 26 supported on the sides of the housing 19. There is a similar pair of rollers 27 near the rear of this housing. The rollers 27 engage the under side of a transverse bar 28 of hardened steel which is mounted in a notch in the rear of the decelerometer mass and there engages a rocker support 29. It is retained in position by a pin 31, fixed in the decelerometer mass and extending freely into an opening in the bar 28.

Thus the two opposite ends of the cross bar 28 serve as tracks and are self-aligning with respect to the tracks 25. The decelerometer mass is prevented from skewing by means of two rollers 32 which work freely in grooves formed in the forward and rear ends of the shell 22. The construction is clearly shown in Figure 3. It is unnecessary here to supply steel inserts similar to the track members 25 because the rollers 32 carry no substantial load.

It is important that the track members 25 and 28 be of suitable material carefully heat-treated, for the reason that the decelerometer mass weighs about 100 pounds, and when the train is running at speed, stands at its rearmost position against the stop 33. Consequently, vibration causes the rollers 26 and 27 to deliver frequent minor impacts to the tracks, and this action is localized as to the tracks. In the course of time depressions in the track would develop, unless the material be suited to the duty imposed. The rubber pads 15 relieve the device of much of the vibration and reduce shocks to which it would otherwise be subjected.

Mounted upon housing 19 is the cover 34 which also serves as a pipe bracket and mount for various components (see Figs. 9-13). Pivoted in this cover on ball bearings at 35 is the motion transmitting lever 36. This has a roller thrust bearing 37 at its lower end which reacts in thrust against the lug 38 on the forward end of the decelerometer mass. A similar roller thrust bearing 39 at its upper end reacts against the forward end of the modulating valve hereinafter described. A removable inspection cap 41 is provided as shown.

Mounted above the cover 34 is the housing 42 of the modulating valve. This is shown in considerable detail in Figures 6, 7 and 8. The housing 42 is formed to receive the seat bushing 43 in which the modulating valve 44 is mounted. This valve 44 is of the inside cut-off balanced piston type and the valve and seat bushing are fully described in the patent to Campbell, No. 2,136,578, November 15, 1938.

The three ports in the valve seat bushing 43, which the valve 44 controls, are the supply port 45, the control chamber port 46, and the exhaust port 47. The control pipe which corresponds to the pipe 141 of Patent No. 2,136,582 is connected to the cover 34 at 48. From this port a cored passage in the cover leads to the opening 49 in the seat for housing 42 formed in the top of the cover 34. It also leads to an opening 50 in the forward end of the cover 34.

This opening 50 and a companion opening 51 are formed in a mounting seat against which is mounted the pressure limiting valve generally indicated by the numeral 52 applied to its housing. So far as is at present material, the pressure limiting valve 52 controls flow from the port 50 to the port 51. The magnet element indicated at 53, when energized, opens a by-pass valve (not shown but enclosed in housing 52) and renders the limiting valve ineffective. When the magnet 53 is deenergized the by-pass valve is closed and the limiting valve operates to limit the pressure which can be developed on the discharge side of the limiting valve, i. e., in port 51. Port 51 leads through a second cored passage to the opening 54 in the top of the cover 34 and leads thence to the chamber formed in housing 42 to the inlet port 45.

The control chamber port 46 leads by way of a passage 55 in housing 42 to an opening 56 in the top of the cover 34 and thence by a cored passage to the opening 57 on the right side of the cover 34. The opening 57 is connected by a flexible hose 58 with control chamber 13. The purpose in using the flexible hose is to accommodate vibration permitted by the pads 15.

The exhaust port 47 leads by a passage 59 formed wholly in the housing 42 to a threaded opening 60 in which is mounted the usual retainer valve 61. This valve inhibits complete release of the brakes by the decelerometer. The port 59 appears on Figure 3, and on Figure 8 and runs below the release check valve which will now be described.

The release check valve is shown at 62 in Figure 3 and opens to permit flow from a branch of the passage 55 to a passage 63 which communicates through the opening 49 (see Figure 9) with the control pipe connection 48. The valve 62 is urged to its seat by a coiled compression spring 64 which reacts between the valve and a removable cap 65. Thus the releasing check valve 62 permits flow from the control chamber 13 directly to the control pipe connection 48 and by-passes the modulating valve 44 and the limiting valve 52 completely.

The small choke indicated at 66 is an equalizing connection of negligible capacity between the control pipe and the control chamber. It forms a part of the claimed subject matter of my pending application above identified.

Adjustably threaded into the rear end of the housing 42, which is specially formed to receive it (see Figures 6, 7 and 8) is the open-ended cylinder 67 (see Figure 2) in which is mounted the loading piston 68 for the decelerometer. The rearward or normal position of this piston is defined by the stop ring 69 which is threaded into the rear end of the adjustable cylinder 67. The piston is subject on its rear face to pressures existing within the cap 71 which is removably mounted on the rear end of the housing 42. That space is connected by a passage 72 (see Figures 2, 3 and 8) with an opening 73 in the right side of the housing 42 (see Figure 8).

The piston 68 supports the rear end of the loading spring 74. The forward end of this spring reacts through a spring seat 75 upon the rear end of the modulating valve 44.

When the space within the cap 71 is vented to atmosphere, the piston 68 is at its rear position and the decelerometer is loaded for a low deceleration rate, say two miles per hour, per second. When the piston 68 is subjected on its rear face to a pressure of say 20 or 30 pounds gauge, it moves forward to the limit of its motion and loads the decelerometer to maintain a higher deceleration rate, say 3 or 3½ miles per hour, per second.

Various means have been proposed, and some of them have been used commercially to control the pressure acting on the loading piston 68. In the present embodiment use is made of the same operative principle which is disclosed in Patent No. 2,136,582. A change-over valve which, in that patent, is generally indicated by the numeral 154, a double seated check valve there indicated by the numeral 151 and a loading piston there indicated by the numeral 89 are the components embodied in the present device. According to the present invention these components are very closely associated with the decelerometer. They are mounted in a housing 76 bolted to the right side of the housing 42. These parts are best shown in Figures 4 and 5. The double seated check valve is indicated at 77, and its rear seat is adapted to be connected to the loading pipe which corresponds to the pipe 149 of Patent No. 2,136,582. This connection is made to the passage 78 on the left side of the cover member 34 (see Figure 10), thence through a cored passage to the opening 79 in the upper face of the cover 34. The opening 79 communicates with the passage 81 in the housing 42 (see Figure 8) and this leads to the opening 82 on the right face of that housing. A third opening 83 communicates with a branch of the control chamber passage 55 already described.

The body 76 is mounted against the right side face of the body 42 so that the opening 82 communicates with the space 84 behind the rear seat of the double-seated check valve 77. The opening 73 communicates with the space 85 surrounding the ported bushing in which the double-seated check valve 77 works. The opening 83 communicates with the space 86 beneath the seat of the cup-shaped change-over valve 87.

This valve 87 is mounted in a ported bushing 88 and is urged toward its lower seat by a coiled compression spring 89. When held to its lower seat the space 91 around the bushing 88 which communicates with the space ahead of the forward seat of the double-seated check valve 77 is connected to atmosphere by way of the port 93 and the passage 94.

With the present deceleration control connected with an engineer's brake valve and an application valve as shown in Patent No. 2,136,582, if the engineer's brake valve is in an application position, main reservoir air is supplied through the loading pipe to the space 84. The check valve 77 moves forward and main reservoir air is admitted by way of space 85 and passage 72 to react on the piston 68. In lap position of the engineer's brake valve the loading pipe is connected to atmosphere. However, if at the time of shift to lap position, control chamber pressure acting in chamber 86 is above the resistnce offered by spring 89 (say 30 pounds per square inch), the change-over valve 87 moves upward, closing the exhaust port 93 and connecting control chamber with the space at the forward end of the double-seated check valve 77. Consequently the check valve then shifts to the rear and control chamber pressure acts against the piston 68.

Thus, the double-seated check valve and the changeover valve have exactly the same functions which they have in the structure of Patent No. 2,136,582, but the flow paths are much shorter, the mechanism is completely accessible and may be readily dismounted for inspection or repair, or may be readily replaced by an interchangeable unit, either one identical therewith or one arranged to have somewhat different operating characteristics.

It will be observed that the horizontal projected area of the housing 42 is much less than the horizontal projected area of the cover 34, and that the opening through which the lever 36 passes, which opening is indicated at 95 (see Figure 9), is quite small. The housing 19 with its cover 34 and the lower portion of the housing 42 are all filled with lubricating oil, the normal level of the oil being approximately the lower margin of the removable plug 96 which is visible in Figure 2.

The motion of the inertia mass in the housing does not displace oil from the housing, for the narrow opening 95 forms a sort of restricted stand pipe which prevents access of air to the space below the top of cover 34. Consequently, oil does not surge up and down through the opening 95 and the body of oil around the inertia mass is inert, except to the extent that it flows around this mass when the mass moves forward and back. Consequently, oil surging is eliminated.

The modulating valve can be reached by removing only a portion of the oil and without disturbing the inertia mass and its supporting mechanism at all. This is useful because the inertia mass rarely requires servicing whereas access to the modulating valve and its loading mechanism should be had at regular intervals.

In case the functions of the pressure limiting valve are not desired, this unit can be removed, in which event the application of a simple ported plate connecting the ports 51 and 52 will condition the device for operation.

Similarly, if the functions of the change-over valve and the double-seated check valve are not desired, a simple blanking plate for the openings 82, 83 and 73 (see Figure 8) may be applied to the right side of the housing 42.

While the preferred embodiment of the device has been described in considerable detail, this description is to be taken as illustrative rather than limiting.

What is claimed is:

1. A unitary deceleration control mechanism for high speed fluid pressure brakes comprising a base arranged to serve as a control chamber; a housing positioned above said base; yielding shock absorbing means forming a supporting connection between said base and said housing; a modulating valve mounted in said housing; a decelerometer also mounted in said housing and connected to actuate said modulating valve, and a flexible tubular connection between said modulating valve and the control chamber in said base.

2. The combination defined in claim 1, in which the decelerometer comprises an inertia mass mounted to shift in said housing in the lower portion thereof, the modulating valve is mounted in the upper portion of the housing, and the housing is filled with lubricating oil to a level substantially above the top of the inertia mass, the parts being so arranged as to resist surging flow of said oil in the housing.

3. A deceleration control unit for high speed brakes comprising a base arranged to serve as a control chamber; a housing positioned above said base and comprising a lower main portion and a removable cover portion; yielding supports interposed between said lower portion and said base; an inertia mass guided in said lower portion; a modulating valve housing releasably mounted on said cover portion; a modulating valve mounted in the last named housing; and a lever mechanism forming an operative connection between the inertia mass and said modulating valve, said lever mechanism being sustained by said cover and being removable therewith; said cover and the housing of said modulating valve having mating ports and the cover being provided with releasable pipe connections for connections to and from said modulating valve.

4. A deceleration control unit for high speed brakes comprising; a housing including a case portion and a releasable cover portion; an inertia mass guided in said case portion; a modulating valve housing releasably mounted on said cover portion; a modulating valve mounted in the last named housing; a lever mechanism sustained by said cover portion and forming an operating connection between the inertia mass and the modulating valve; said cover portion and the housing of said modulating valve having mating ports and the cover portion being provided with releasable pipe connections for connections to and from the modulating valve.

5. In a deceleration control unit, the combination of a plate having a control pipe port and a control chamber port; means for connecting said ports respectively with the control pipe and control chamber of a brake system; means for guiding an inertia mass releasably connected with said plate; an inertia mass guided by said guiding means; a modulating valve housing releasably mounted on said plate and having ports which connect with ports in said plate; a modulating valve in said housing and controlling communication between ports therein; and an actuating connection between said inertia mass and said modulating valve, said actuating connection being sustained by said plate.

6. In a deceleration control unit, the combination of a plate having a control pipe port and a control chamber port; means for connecting said ports respectively with the control pipe and control chamber of a brake system; means for guiding an inertia mass releasably connected with said plate; an inertia mass guided by said guiding means; a modulating valve housing releasably mounted on said plate and having ports which connect with ports in said plate; a modulating valve in said housing and controlling communication between ports therein; an actuating connection between said inertia mass and said modulating valve, said actuating connection being sustained by said plate, and a pressure limiting valve controlling flow between certain ports in said plate, said valve including a housing releasably mounted on said plate in communication with said ports.

7. In a deceleration control unit, the combination of a plate having a control pipe port, a control chamber port and a loading port; means for connecting said ports respectively with the control pipe, the control chamber and the loading pipe of a brake system; means for guiding an inertia mass releasably connected with said plate; an inertia mass guided by said guiding means; a modulating valve housing releasably mounted on said plate and having ports which connect with ports in said plate; a modulating valve in said housing and controlling communication between ports therein; an actuating connection between said inertia mass and said modulating valve, said actuating connection being sustained by said plate, adjustable loading means for said modulating valve, also mounted in the modulating valve housing; and a control unit comprising a ported housing enclosing a pressure responsive change-over valve and a double seated check valve, said control unit housing being releasably mounted closely adjacent said modulating valve housing with ports in the control unit housing connected respectively with ports in said plate and with said adjustable loading means.

CHARLES A. CAMPBELL.